(12) United States Patent
Dvorak et al.

(10) Patent No.: US 8,504,574 B2
(45) Date of Patent: Aug. 6, 2013

(54) METHOD AND SYSTEM FOR FRESHNESS INDICATION OF LOCATION DATA

(75) Inventors: Joseph L. Dvorak, Boca Raton, FL (US); Bettina Meles, Weston, FL (US); Pablo Meles, Weston, FL (US)

(73) Assignee: Motorola Mobility LLC, Libertyville, IL (US)

( * ) Notice: Subject to any disclaimer, the term of this patent is extended or adjusted under 35 U.S.C. 154(b) by 2551 days.

(21) Appl. No.: 10/975,700

(22) Filed: Oct. 28, 2004

(65) Prior Publication Data

US 2006/0095451 A1    May 4, 2006

(51) Int. Cl.
*G06F 7/00* (2006.01)
*G06F 17/30* (2006.01)

(52) U.S. Cl.
USPC ............ 707/738; 707/740; 707/915; 707/919

(58) Field of Classification Search
USPC .................. 707/738, 740, 915, 919
See application file for complete search history.

(56) References Cited

U.S. PATENT DOCUMENTS

| | | | |
|---|---|---|---|
| 5,179,651 A | 1/1993 | Taaffe et al. | |
| 5,727,112 A * | 3/1998 | Kellar et al. | 386/52 |
| 6,549,896 B1 | 4/2003 | Candan et al. | |
| 6,694,366 B1 | 2/2004 | Gernert et al. | |
| 2002/0001032 A1 * | 1/2002 | Ohki | 348/207 |
| 2003/0160817 A1 * | 8/2003 | Ishida et al. | 345/738 |
| 2004/0088110 A1 | 5/2004 | Suzuki | |
| 2005/0046706 A1 * | 3/2005 | Sesek et al. | 348/231.3 |
| 2005/0060299 A1 * | 3/2005 | Filley et al. | 707/3 |
| 2006/0066503 A1 * | 3/2006 | Sampsell et al. | 345/1.1 |

* cited by examiner

*Primary Examiner* — Mariela Reyes

(57) ABSTRACT

A system (50) and method (10) providing a user with a qualitative indication of a freshness of location information with minimal user disruption can include the steps of obtaining (12) presentation data, associating (14) a location indication representative of a location when the presentation data was obtained, and altering (16) a data characteristic of the presentation data over time to provide an indication of a freshness of the location indication. The method can further include the step of presenting (19) the presentation data to a user. Note, presentation data for example can be data for a digital photograph or an audio sample. The step of altering the data characteristic can optionally involve altering (18) at least one among a contrast, brightness, sharpness, pixel resolution, vertical positioning, horizontal positioning, color setting, white balance, compression ratio, language setting, volume, pitch, and equalization setting.

20 Claims, 3 Drawing Sheets

12 — OBTAIN PRESENTATION DATA SUCH AS DATA FOR A DIGITAL PHOTOGRAPH OR AN AUDIO SAMPLE WHICH CAN SERVE FOR EXAMPLE AS WALLPAPER ON A DISPLAY OR AS AN ALERT/RING TONE RESPECTIVELY

14 — ASSOCIATE A LOCATION INDICATION REPRESENTATIVE OF A LOCATION WHEN THE PRESENTATION DATA WAS OBTAINED

16 — ALTER A DATA CHARACTERISTIC OF THE PRESENTATION DATA OVER TIME TO PROVIDE AN INDICATION OF A FRESHNESS OF THE LOCATION INDICATION

18 — ALTER AT LEAST ONE AMONG A CONTRAST, BRIGHTNESS, SHARPNESS, PIXEL RESOLUTION, WHITE BALANCE, COMPRESSION RATIO, LANGUAGE SETTING, VOLUME, PITCH, AND EQUALIZATION SETTING

19 — PRESENT THE PRESENTATION DATA TO A USER AFTER ALTERING THE DATA CHARACTERISTIC

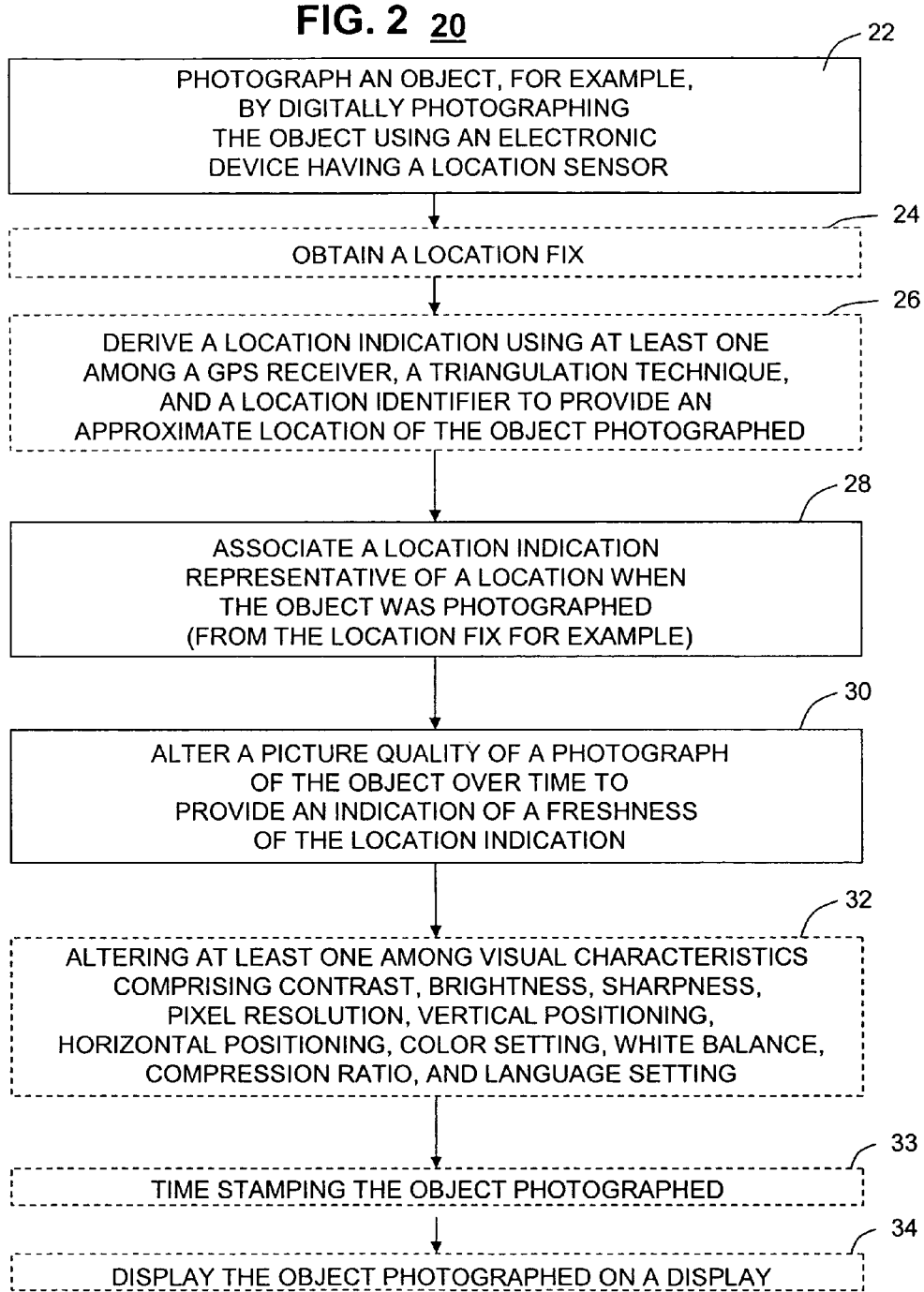

METHOD AND SYSTEM FOR FRESHNESS INDICATION OF LOCATION DATA

FIELD OF THE INVENTION

This invention relates generally to recording devices, and more particularly to a method and system of indicating freshness of location data in a recording device.

BACKGROUND OF THE INVENTION

In context aware applications, one of the important criteria is often the "freshness" of data. "Freshness" relates to how recently the piece of data was determined. As data ages, it becomes less reliable because the environment may have changed since the data was acquired. In location aware applications, the freshness of the location information can be very important, especially since the user may be mobile and their location can change over time. Navigation systems used in vehicles provide users with visual and audio updates where the data content changes as the location changes. No existing system is known where a characteristic or quality of the presentation data itself changes to reflect a lack of freshness of location information. Some devices, such as small portable electronic devices such as camera phones having multiple functions can present visual and audio updates and can even perform navigational functions. In such instances, the devices might at least be temporarily dedicated to such navigational functions and essentially present updated data to indicate changes in location. Operating in other functions, such multifunctional devices fail to provide a freshness indication of location data in as unobtrusive a manner as possible so as to minimize the user's disruption for their current task. For example, in a standby mode where only "wallpaper" might be viewed on a display or in an MP3 playing or other source playing mode, no indication of the freshness of the location data is found in existing systems.

SUMMARY OF THE INVENTION

In a first embodiment of the present invention, a method for indicating a freshness of data used in a context aware application can include the steps of obtaining presentation data, associating a location indication representative of a location when the presentation data was obtained, and altering a data characteristic of the presentation data over time to provide an indication of a freshness of the location indication. The method can further include the step of presenting the presentation data to a user after altering the data characteristic. Note, presentation data for example can be data for a digital photograph or an audio sample which can serve in a simple example as wallpaper on a display or as an alert or ring tone respectively. The step of altering the data characteristic can involve altering at least one among a contrast, brightness, sharpness, pixel resolution, white balance, compression ratio, language setting, volume, pitch, and equalization setting.

In a second embodiment of the present invention, a method for indicating a freshness of a picture used in a context aware application can include the steps of photographing an object, associating a location indication representative of a location when the object was photographed, and altering a picture quality of a photograph of the object over time to provide an indication of a freshness of the location indication. The method can further include the step of obtaining a location fix before the step of associating the location indication. The step of photographing the object can include the step of digitally photographing the object using an electronic device having a location sensor. The step of associating the location indication can include the step of deriving a location indication using at least one among a GPS receiver, a triangulation technique, and a location beacon or identifier to provide an approximate location of the object photographed. The method can further include the step of time stamping the object photographed and displaying the object photographed on a display. Note, the step of altering the picture quality can include altering at least one among visual characteristics including contrast, brightness, sharpness, pixel resolution, vertical positioning, horizontal positioning, color setting, white balance, compression ratio, and language setting.

In a third embodiment of the present invention, a system for indicating a freshness of data used in a context aware application includes a location device capable of receiving location information, a recording device such as an image recording device or a sound recording device coupled to the location device for recording at least one among a video signal and an audio signal, a presentation device coupled to the recording device for presenting at least one among the video signal and the audio signal, and a processor coupled to the recording device, the presentation device and the location device. The recording device can be for example at least one among a digital camera, a camera phone, a digital video camera, a video phone, an MP3 burner, a DVD burner, a CD burner, or a hard drive. The location device can be at least one among a GPS receiver, a receiver using a triangulation technique, and receiver capable of receiving a location identifier. The presentation device can be for example a display for displaying the object photographed or a speaker for providing an audio output.

The processor can be programmed to associate a location indication with presentation data obtained at a location representative of the location indication and alter a data characteristic of the presentation data over time to provide an indication of a freshness of the location indication. The processor can be further programmed to alter a data quality by altering at least one among visual characteristics comprising contrast, brightness, sharpness, pixel resolution, vertical positioning, horizontal positioning, color setting, white balance, compression ratio, and language setting or by altering a data quality by altering at least one among audio characteristics comprising language setting, volume, pitch, and equalization setting. When the recording device is at least one among a digital camera, a camera phone, a digital video camera or a video phone, the processor can be further programmed to associate a location indication with an object photographed at a location representative of the location indication and alter a picture quality of the object photographed over time to provide an indication of a freshness of the location indication. When the location device includes a GPS receiver or other location detecting device, the processor can be further programmed to obtain a location fix before the processor associates the location indication with the presentation data.

Other embodiments, when configured in accordance with the inventive arrangements disclosed herein, can include a system for performing and a machine readable storage for causing a machine to perform the various processes and methods disclosed herein.

BRIEF DESCRIPTION OF THE DRAWINGS

FIG. 1 is a flow chart illustrating a method of indicating a freshness of data in a context aware application in accordance with an embodiment of the present invention.

FIG. 2 is a flow chart illustrating another method of indicating a freshness of data in a context aware application in accordance with an embodiment of the present invention.

DETAILED DESCRIPTION OF THE DRAWINGS

Figure 3:
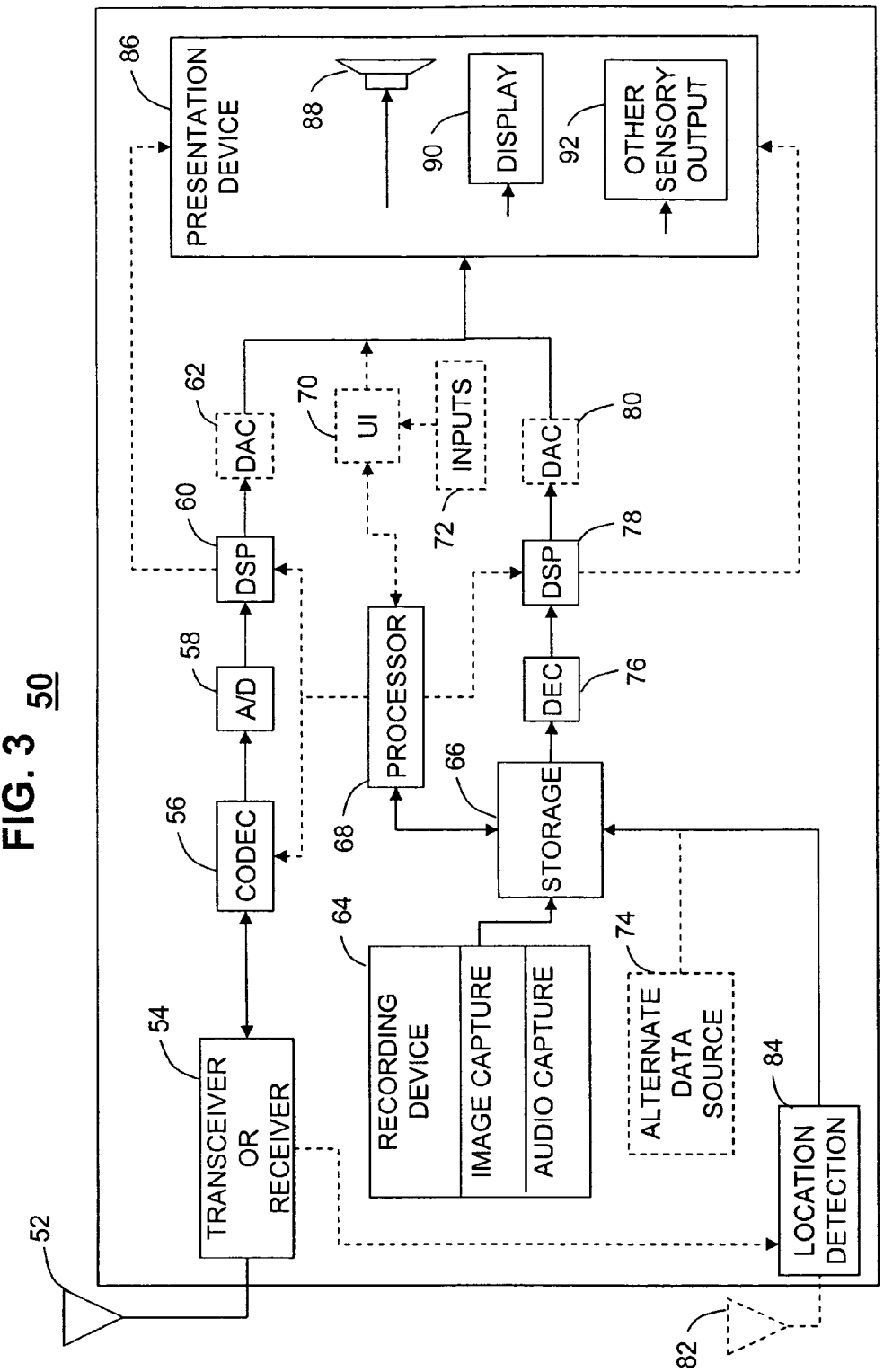
FIG. 3 is a block diagram of a system for indicating a freshness of data used in a context aware application in accordance with an embodiment of the present invention.

While the specification concludes with claims defining the features of embodiments of the invention that are regarded as novel, it is believed that the invention will be better understood from a consideration of the following description in conjunction with the figures, in which like reference numerals are carried forward.

Referring to FIG. 1, a flow chart illustrating a method 10 that provides the user with a qualitative indication of the freshness of the location information with minimal user disruption. Note that steps in dashed lines denote alternative or optional steps. The method 10 can include the step 12 of obtaining presentation data, the step 14 of associating a location indication representative of a location when the presentation data was obtained, and the step 16 of altering a data characteristic of the presentation data over time to provide an indication of a freshness of the location indication. The method 10 can further include the step 19 of presenting the presentation data to a user after altering the data characteristic. Note, presentation data for example can be data for a digital photograph or an audio sample which can serve in a simple example as wallpaper on a display or as an alert or ring tone respectively. The step of altering the data characteristic can optionally involve altering at least one among a contrast, brightness, sharpness, pixel resolution, vertical positioning, horizontal positioning, color setting, white balance, compression ratio, language setting, volume, pitch, and equalization setting as shown at step 18. Altering the presentation data can also come in numerous other manifestations contemplated by the claims herein including flashing visual data repeatedly for a period of time to reflect a certain freshness of location information where the length of time of the flash or the periodicity (between flashes) or both can provide the indication. A similar concept can be applied to audio data as well with repeating samples having variable length and periodicity in play. Note, the step of altering presentation data does not necessarily involve altering textual data in terms of text color, text placement or font size as might be found in existing navigation systems. Alteration of presentation data herein primarily involves other non-textual indications such as altering of pictures, images, video and audio to provide such indications in a non-obtrusive manner.

Referring to FIG. 2, a more specific method 20 for indicating a freshness of a picture used in a context aware application can include the step 22 of photographing an object, the step 28 of associating a location indication representative of a location when the object was photographed, and the step 30 of altering a picture quality of a photograph of the object over time to provide an indication of a freshness of the location indication. The method 20 can further include the step 24 of obtaining a location fix before the step 28 of associating the location indication. The step 22 of photographing the object can include the step of digitally photographing the object using an electronic device having a location sensor. The step of associating the location indication can include the step 26 of deriving a location indication using at least one among a GPS receiver, a triangulation technique, and a location beacon or identifier to provide an approximate location of the object photographed. The method 20 can further include the step 33 of time stamping the object photographed and the step 34 of displaying the object photographed on a display. Note, the step of altering the picture quality can include the step 32 of altering at least one among visual characteristics including contrast, brightness, sharpness, pixel resolution, vertical positioning, horizontal positioning, color setting, white balance, compression ratio, and language setting.

Note, with respect to photographs (and even audio samples) that they are high bandwidth objects. In this regard, they can impart a log of information in a short time. Using for example a picture of a user's last location that is known to the location aware service in a cell phone or other handheld device allows the user to determine very quickly where the device thinks the user is. By 'aging' the picture via changing specific visual characteristics (contrast, brightness, etc), the user can tell at a glance the approximate time since the device last received an explicit indication of the location designated by the picture. For example, as the time since the last explicit location fix lengthens, the picture can decrease in brightness. This picture degradation can provide a very easy, intuitive, and quick indication of the age and therefore certainty of the current location information. This mechanism can be used in any device that is capable of receiving location information (e.g. GPS, location beacons, cellular or satellite phones using triangulation, etc).

Referring to FIG. 3, a system 50 for indicating a freshness of data used in a context aware application includes a location device 84 capable of receiving location information, a recording device 64 such as an image recording device or a sound recording device coupled to the location device for recording at least one among a video signal and an audio signal, a presentation device 86 coupled to the recording device for presenting at least one among the video signal and the audio signal, and a processor 68 coupled to the recording device, the presentation device and the location device. The recording device can be for example at least one among a digital camera, a camera phone, a digital video camera, a video phone, an MP3 burner, a DVD burner, a CD burner, or a hard drive. The location device can be at least one among a GPS receiver, a receiver using a triangulation technique, and a receiver capable of receiving a location identifier. The presentation device can be for example a display 90 for displaying the object photographed or a speaker 88 for providing an audio output or a vibrator or other sensor output 92. The location device 84 can be for example a GPS receiver (using antenna 82), a triangulation technique (using information derived from transceiver or receiver 54), or a location beacon or identifier transmitted from a base transmitter from a known location.

In the example of a camera phone, the system 50 can include a receiver or transceiver 54 coupled to an antenna 52 for receiving (or transmitting) digital data over the air. The data can include voice, audio, or image information that can be decoded by a codec 56, converted to a digital signal by a analog to digital converter (A/D) converter 58 and processed by a digital signal processor (DSP) 60. A processed digital signal from the DSP 60 can be converted to an analog signal by a digital to analog converter (DAC) 62 before being presented by the presentation device 88 or alternatively, the processed digital signal can be directly provided to the presentation device 86, particularly if the presentation device 86 is suited for digital signals. The system 50 can further include the recording device 64 in the form of an image and/or audio capturing device such as a camera having an optional microphone for recording sound. Image or audio data captured by the recording device as well as location information can be stored in a memory or storage device 66 coupled to the processor 68. The recorded data can be decoded by a decoder 76 and processed by a DSP 78 and presented by the presentation device 86 either directly or via a DAC 80. In accordance with an embodiment of the present invention, as data captured by the recording device 64 and associated location information from the location device 84 ages, the processor 68 and/or DSP 78 can alter such presentation data to provide a user with an unobtrusive indication of the age of the latest location fix obtained by the system 50.

In the case where the system 50 includes other alternative data sources 74 such as a DVD player, a DVD burner, a CD player, a CD burner, an MP3 player, an MP3 burner, or a hard drive for example, data from such alternative data source can also be associated with location data from the location device 84. If the system 50 is operating as an MP3 player, the presented audio data can be altered in terms of volume, pitch, equalization or other user perceptible manner to provide an indication of a lack of freshness of location information. Likewise, if the system 50 includes ring tones, the ring tones can also be altered in terms of volume, pitch, equalization or other manner to provide the indication. If the system 50 is operating in a standby mode, a user interface 70 which can form a portion of the presentation device 86 can include a background picture or "wallpaper" which can be user selectable using inputs 72. As with the audio data in the MP3 player, the wallpaper image data can be altered in terms of contrast, brightness, sharpness, pixel resolution, vertical positioning, horizontal positioning, color setting, white balance, or compression ratio to provide the indication of location freshness. In the instance where the system operates as a multimedia device such as a video player or television receiver or HDTV receiver, further data qualities can be altered such as language setting, volume, pitch, and equalization to provide the indication of location freshness.

Note, whether the presentation data that is altered to provide the location freshness indication is obtained via the recording device 64 or the alternate data source 74, such presentation data can be transmitted to another device (not shown) to enable others to also share the knowledge of the freshness or lack thereof of the location information available at the system 50. For example, wallpaper data in the user interface 70 can be coded with the appropriate alteration, modification or distortion via a DSP, a processor, and/or encoder to enable such data to be transmitted via transceiver 54 to a remote device. The remote device would need to have knowledge of the algorithm for altering the presentation data used in the system 50 to remotely determine the extent of the lack of freshness of the location data at the system 50. Also note that all of the presentation data doesn't necessarily need to be transmitted to provide the indication remotely. For example, the location freshness indication can be derived from transmitted quality settings for the presentation data such as the settings for contrast, brightness, sharpness, pixel resolution, vertical positioning, horizontal positioning, color setting, white balance, compression ratio, language setting, volume, pitch, or equalization. Knowledge that these quality settings were not user entered might also be useful in deriving the appropriate indication.

In light of the foregoing description, it should be recognized that embodiments in accordance with the present invention can be realized in hardware, software, or a combination of hardware and software. A network or system according to the present invention can be realized in a centralized fashion in one computer system or processor, or in a distributed fashion where different elements are spread across several interconnected computer systems or processors (such as a microprocessor and a DSP). Any kind of computer system, or other apparatus adapted for carrying out the functions described herein, is suited. A typical combination of hardware and software could be a general purpose computer system with a computer program that, when being loaded and executed, controls the computer system such that it carries out the functions described herein. In this regard, an embodiment can take the form of any electronic device capable of determining its location including, but not limited to a cellular phone, a smart phone, or lap top computer, a PDA, a two-way radio, a satellite radio, or any other device having location determining devices incorporated therein.

In light of the foregoing description, it should also be recognized that embodiments in accordance with the present invention can be realized in numerous configurations contemplated to be within the scope and spirit of the claims. Additionally, the description above is intended by way of example only and is not intended to limit the present invention in any way, except as set forth in the following claims.

What is claimed is:

1. A method for indicating a freshness of data used in a context aware application, comprising the steps of:
   obtaining presentation data;
   associating a location indication representative of a location when the presentation data was obtained; and
   altering a data characteristic of the presentation data in a manner that degrades a presentation of the presentation data over time to correspond to an indication of a freshness of the location indication.

2. The method of claim 1, wherein the method further comprises the step of presenting the presentation data to a user after degrading the data characteristic resulting in a degraded presentation.

3. The method of claim 1, wherein the step of obtaining presentation data comprises the step of obtaining at least one among a digital photograph and an audio sample.

4. The method of claim 1, wherein the step of altering the data characteristic comprises at least one among degrading a contrast, brightness, sharpness, pixel resolution, white balance, compression ratio, volume, pitch, and equalization setting.

5. The method of claim 3, wherein the method further comprises the step of using at least one among the digital photograph and the audio sample as wallpaper on a display or as an alert or a ring tone.

6. A method for indicating a freshness of a picture used in a context aware application, comprising the steps of:
   photographing an object;
   associating a location indication representative of a location when the object was photographed; and
   altering a picture quality of a photograph of the object over time to provide an indication of a freshness of the location indication, wherein the picture quality is altered in a manner resulting in picture degradation indicating an age of the location indication.

7. The method of claim 6, wherein the step of photographing the object comprises the step of digitally photographing the object using an electronic device having a location sensor.

8. The method of claim 6, wherein the step of associating the location indication comprises the step of deriving a location indication using at least one among a GPS receiver, a triangulation technique, and a location identifier to provide an approximate location of the object photographed.

9. The method of claim 6, wherein method further comprises the step of obtaining a location fix before the step of associating the location indication.

10. The method of claim 6, wherein the method further comprises the step of time stamping the object photographed.

11. The method of claim 6, wherein the method further comprises the step of displaying the object photographed on a display and degrading the picture quality of the photograph over time to provide the indication of the freshness of the location information.

12. The method of claim 6, wherein the step of altering the picture quality comprises the step of altering at least one among visual characteristics comprising contrast, brightness, sharpness, pixel resolution, vertical positioning, horizontal positioning, color setting, white balance, compression ratio, and language setting.

13. A system for indicating a freshness of data used in a context aware application, comprising:
- a location device capable of receiving location information;
- a recording device coupled to the location device for recording at least one among a video signal and an audio signal;
- a presentation device coupled to the recording device for presenting at least one among the video signal and the audio signal; and
- a processor coupled to the recording device, the presentation device and the location device, wherein the processor is programmed to:
  - associate a location indication with presentation data obtained at a location representative of the location indication; and
  - alter a data characteristic of the presentation data over time to provide an indication of a freshness of the location indication by degrading a data quality over time that degrades a presentation in a manner that corresponds to the freshness of the location indication.

14. The system of claim 13, wherein the processor is further programmed to degrade a data quality by altering at least one among visual characteristics comprising contrast, brightness, sharpness, pixel resolution, white balance and, compression ratio, or by degrading a data quality by altering at least one among audio characteristics comprising volume, pitch, and equalization setting.

15. The system of claim 13, wherein the recording device comprises at least one among an image recording device and a sound recording device.

16. The system of claim 13, wherein the recording device comprises at least one among a digital camera, a camera phone, a digital video camera and a video phone and the processor is further programmed to associate a location indication with an object photographed at a location representative of the location indication and degrade a picture quality of the object photographed over time to provide a non-textual indication of a freshness of the location indication in a non-obtrusive manner.

17. The system of claim 13, wherein the location device comprises at least one among a GPS receiver, a receiver using a triangulation technique, and receiver capable of receiving a location identifier.

18. The system of claim 16, wherein the system further comprises a presentation device selected among a display for displaying the object photographed and a speaker for providing an audio output.

19. The system of claim 13, wherein system further comprises a GPS receiver and the processor is further programmed to obtain a location fix before the processor associates the location indication with the presentation data.

20. The system of claim 13, wherein the recording device comprises at least one among a digital camera, a camera phone, a digital video camera, a video phone, an MP3 burner, a DVD burner, a CD burner, and a hard drive.

* * * * *